United States Patent [19]

Yoder et al.

[11] Patent Number: 5,486,375
[45] Date of Patent: Jan. 23, 1996

[54] CASEINATE REPLACEMENT COMPOSITION FOR IMITATION CHEESE AND PROCESS FOR MAKING IMITATION CHEESE

[75] Inventors: David Yoder, Crown Point, Ind.; Shau-Gan Chang, Chicago, Ill.; Ansui Xu, Griffith, Ind.; Thomas Domoras, Commerce, Ga.

[73] Assignee: American Maize Technology, Inc., Dimmitt, Tex.

[21] Appl. No.: 268,804

[22] Filed: Jun. 29, 1994

Related U.S. Application Data

[63] Continuation-in-part of Ser. No. 69,140, May 28, 1993, abandoned.

[51] Int. Cl.$^6$ .................................................... A23C 20/00
[52] U.S. Cl. ........................ 426/582; 426/583; 426/575; 426/576; 426/578
[58] Field of Search .................................... 426/573, 575, 426/576, 577, 578, 580, 661, 804

[56] References Cited

U.S. PATENT DOCUMENTS

| | | |
|---|---|---|
| 3,836,677 | 9/1974 | Freck et al. . |
| 4,104,413 | 8/1978 | Wynn et al. . |
| 4,127,678 | 11/1978 | Burkwall, Jr. ........................ 426/250 |
| 4,228,199 | 10/1980 | Chiu et al. . |
| 4,499,116 | 2/1985 | Zwiercan et al. . |
| 4,568,555 | 2/1986 | Spanier .................................. 426/582 |
| 4,608,265 | 8/1986 | Zwiercan et al. . |
| 4,678,676 | 7/1987 | Ishizuka et al. ........................ 426/573 |
| 4,684,533 | 8/1987 | Kratochvil .............................. 426/575 |
| 4,695,475 | 9/1987 | Zwiercan et al. . |
| 4,724,152 | 2/1988 | Baker et al. ............................ 426/335 |
| 4,859,484 | 8/1989 | Bielskis et al. ........................ 426/573 |
| 4,971,723 | 11/1990 | Chiu et al. . |
| 4,981,709 | 1/1991 | Furcsik et al. . |
| 5,275,837 | 1/1994 | Eastman .................................. 426/661 |

FOREIGN PATENT DOCUMENTS

| | | |
|---|---|---|
| 0402555 | 12/1990 | European Pat. Off. . |
| 2622772 | 5/1989 | France . |
| 61-108333 | 5/1986 | Japan . |
| 9414887 | 7/1994 | WIPO . |

OTHER PUBLICATIONS

Institute of Food Technologies, 1973, "Food Applications of High Amylose Starches" by Clifford H. Hullinger et al., 2 pages.

Food Processing Magazine, Jul. 1972, "Foods of Tomorrow–New Generation of Texture Protein".

*Primary Examiner*—Helen Pratt
*Attorney, Agent, or Firm*—Lucas & Just

[57] ABSTRACT

The caseinate replacement composition for imitation cheese is made of a granular hydroxypropylated, high amylose starch having a degree of substitution of greater than 0.04, gelatin and a gum such as pectin and carrageenan. The gum is used to decrease the amount of gelatin necessary and to improve the texture of the overall cheese analog. The caseinate replacement composition replaces all or a portion of the caseinate in the imitation cheese.

20 Claims, No Drawings

CASEINATE REPLACEMENT COMPOSITION FOR IMITATION CHEESE AND PROCESS FOR MAKING IMITATION CHEESE

This is a continuation-in-part of U.S. patent application Ser. No. 08/069,140 filed May 28, 1993 now abandoned.

This invention relates to imitation cheese and, more specifically, to a caseinate replacement composition for use in imitation cheese.

Imitation cheese is a product in which vegetable fats and/or oils are used to replace milk fats normally present in cheese. Typically, imitation cheeses are made from water, caseinate, vegetable fat/oil and flavoring. A starch such as thin-boiled starch may also be present in a typical imitation cheese formulation. The caseinate is usually sodium, potassium, or calcium caseinate as well as the salts generated by treating casein and rennet casein with a base. Caseinate provides not only protein to the cheese but also provides the cheese with certain physical attributes.

Casein and caseinates, which are obtained from milk, often fluctuate in price and availability. Pregelatinized, converted and/or derivatized starches have been suggested as alternatives to caseinate, e.g. U.S. Pat. Nos. 4,499,116; 4,608,265; and 4,695,475.

It has now been discovered that caseinate can be replaced with a composition comprising a granular, hydroxypropylated high amylose starch and a gel component. This composition can be used to replace up to about 70% by weight of the caseinate used in imitation cheese.

The gel component is preferably a combination of gelatin and a gum such as xanthan gum or pectin. Gums are generally obtained from natural sources and often fluctuate in availability and cost. Typically, gums are too expensive to use alone and it has been found that by using a gelatin in combination with the gum, the cost of the caseinate replacement of the present invention is reduced. However, a gum alone or a gelatin alone can be used as the gel component in the formulation of the caseinate replacement of the present invention.

The caseinate replacement composition of the present invention provides for a more efficient use of starch than conventional caseinate replacement compositions that employ pregelatinized starch. The granular starch of the present invention provides more efficient use of starch than the prior art pregelatinized starches because the granular starch of the present invention provides better thickening capability than the pregelatinized starches. Additionally, by eliminating the pregelatinization step, the cost of manufacture of the starch component of the present invention is less than conventional pregelatinized caseinate replacement starches.

If a thin-boiled starch is present in the conventional imitation cheese formulation, it is preferred that such starch be eliminated when using the caseinate replacement composition of the present invention.

The amount of granular starch in the caseinate replacement composition of the present invention is about 50% to about 80% by weight of caseinate replacement composition. Preferably, about 50% to about 70% by weight of said caseinate replacement composition is made up of said granular starch. Good results have been obtained when the granular starch makes up about 55% to about 65% by weight of the caseinate replacement composition of the present invention.

The amount of gel component used in the caseinate replacement composition of the present invention is about 50% to about 20% by weight of caseinate replacement composition. Preferably, about 50% to about 30% by weight of said caseinate replacement composition is made up of said gel component. Good results are obtained when the gel component makes up about 45% to about 35% by weight of the caseinate replacement composition of the present invention.

Gelatin when used in large amounts in the gel component, say about 35% by weight of the caseinate replacement composition of the present invention (or 70% of the gel component), adds a yellow tint to the caseinate replacement composition of the present invention. This yellow tint is of no concern for a cheese that has a normal yellow color; however, to a cheese that is normally white, for example, mozzarella, this yellow tint is undesirable. Where the yellow tint is undesirable, the amount of gelatin used in the caseinate replacement composition of the present invention is reduced and a gum is used with the gelatin in the gel component of the caseinate replacement composition of the present invention. The gum is preferably either a natural gum such as carrageenan or a modified gum such as low methoxyl pectin.

Furthermore, the use of a gum with the gelatin has been found not only to reduce the yellow color attributable to the gelatin, but also to improve the matting characteristic, the melting characteristic and the texture of the imitation cheese. Thus, it is preferred that the caseinate replacement composition of the present invention use both gelatin and a gum.

When a gum is used in the gel component of the caseinate replacement composition of the present invention, it is used in an amount of about 1% to about 25% by weight composition. Preferably, the gum is used in an amount of about 5% to about 15% by weight of said composition. Good results with the gum when used in the caseinate replacement composition of the present invention have been obtained when the gum is present in an amount of about 10% by weight of the composition. When a gum is used, the remainder of the gel component is gelatin. A preferred gel composition comprises pectin in an amount of about 5 to about 15% by weight of the composition and carrageenan in an amount of about 1 to about 15% by weight of said composition.

The hydroxypropylated, high amylose granular starch used in the present invention is not cross-linked or converted. It has an apparent amylose content of greater than 40% and a degree of substitution of the hydroxypropyl group for the hydroxyl group on the starch of at least about 0.04.

Starch obtained from corn, potato, wheat, rice, sago, tapioca, or sorghum are acceptable base starches so long as they have an apparent amylose content greater than about 40%. Suitable sources for such high amylose starch include high amylose corn starch and high amylose barley starch. Preferably, high amylose corn starch is used. The apparent amylose content must be above about 40% and more preferably about 50% and above. Good results have been obtained with a corn starch having an apparent amylose content of about 50 to about 70%. Such a high amylose corn starch is available from American Maize-Products Company under the trademark AMAIZO®5, a high amylose corn starch having an amylose content of about 50%.

The term "amylose content" or "apparent amylose content" of the starch as used in the specification and claims means the amylose content of the starch prior to hydroxypropylation as determined by conventional spectrophotometric iodine absorption.

The degree of substitution of hydroxypropylated starch must be at least about 0.04 and more preferably about 0.05 to about 0.3. Good results have been obtained with a hydroxypropylated starch having a degree of substitution of about 0.08 to about 0.2.

The term "degree of substitution" as used in the specification and claims means the number of hydroxypropyl radicals, —CH$_2$CH(OH)CH$_3$, per anhydroglucose unit in the starch polymer. The degree of substitution is determined in a conventional manner (C-30, revision 11-9-73 Standard Analytic Methods CRA Manual).

The hydroxypropylated, high amylose starch used in the present invention is granular in structure. This means it is not subject to a pregelatinization step. The term "granular" means that the starch has substantially retained or completely retained its granular structure. The terms "granular starch" and "pregelatinized starch" are well-known to those of skill in the art. The starch of the present invention is not pregelatinized.

The granular hydroxypropylated starch having a degree of substitution greater than about 0.04 and an apparent amylose content of greater than 40% is made in a conventional manner. The high amylose starch in granular form is slurried in water to a Baume of about 17° to 22°, preferably about 19° Be. To this slurry is added about 5 to 20% by weight sodium sulfate based on dry starch weight, preferably 10%, to protect the starch from swelling. The slurry and sodium sulfate is mixed for about 15 minutes. Then about 0.07 moles of sodium hydroxide per mole starch anhydroglucose unit is added to the slurry. Preferably, the sodium hydroxide is added as a 4% solution and preferably is added below the surface of the slurry. The slurry is then transferred to a reaction vessel equipped with a reflux condenser. Then about 4% to about 15% and preferably about 10% by weight based on dry starch weight of propylene oxide is added to the slurry over a period of about 30 minutes using gravity feed through a funnel where the end of the funnel tube is below the slurry surface while mixing the slurry. After about an additional 30 minutes of mixing the slurry at ambient temperature, the temperature of the slurry is raised to about 40° C. to about 50° C. and the slurry is held at that temperature for about 20 hours. Mixing is continued throughout the reaction. After about 20 hours the slurry is neutralized to a pH of about 5.5 to about 6.0 with dilute hydrochloric acid (HCl) or sulfuric acid (H$_2$SO$_4$). The slurry is then dewatered, preferably by centrifuge. Next, the product is washed by reslurrying the product to about 19°Be and dewatering. The product is then dried in a conventional manner to about 12% moisture. Finally the product is milled through a 30 mesh screen.

U.S. Pat. No. 4,981,709 issued Jan. 1, 1991 teaches making such a granular, non-crosslinked hydroxypropylated, high amylose starch and using such starch as a fat replacer. It is surprising and unexpected that such a granular, non-crosslinked hydroxypropylated, high amylose starch can be used in a formulation for replacement of caseinate. Such a starch is available from American Maize-Products Company under the name AMALEAN I®.

Gelatin is a product obtained by the partial hydrolysis of collagen derived usually from the skin, white connective tissue, and bones of animals. It is a derived protein composed of various amino acids linked by adjacent amino and carbonyl groups to provide a peptide bond. Type-B gelatin is prepared by swelling the raw materials (usually ossein or hide stock) in an alkali saturated lime solution for 3–12 weeks. On the other hand, type-A gelatin is prepared by swelling raw materials (usually pork skins) in a dilute acid solution at a pH of 1 to 2 for 10 to 30 hours. The acid solution is prepared from hydrochloric acid, sulfurous acid, phosphoric acid or sulfuric acid. In accordance with the present invention, type-A gelatin or type-B gelatin may be utilized. The gelatin is also classified by Bloom strength. Bloom strength is a conventional numerical designation which distinguishes gelatin on a gel strength basis. Preferably, the Bloom strength of the gelatin employed in the present invention is about 175 to about 300 and, more preferably, about 250. The lower the Bloom strength of the gelatin, the larger the amount of gelatin needed. Suitable commercial gelatins for use in accordance with the present invention include beef and pork gelatin.

The gum is a natural or modified gum. The natural gums include extracts from seaweed, plant exudates, seed or root gums and gums obtained from microbial fermentation. Modified gums include derivatives of natural gum and certain synthetic gums. Any conventional source of such gum can be used so long as the gum is suitable for use in food. Suitable natural gums for use in the present invention include agar, algin, carrageenan, guar gum, gum arabic, gum ghatti, gum tragacanth, karaya gum, locust bean gum, pectin and xanthan gum. Suitable modified gums include cellulose derivatives such as sodium carboxymethylcellulose, microcrystalline cellulose, methylcellulose; pectin derivatives such as low-methoxyl pectin; alginates such as propylene glycol alginate, triethanol-amine alginate; carboxymethyl locust bean gum; gellan gum and carboxymethyl guar gum.

The preferred gum for use in the present invention is selected from the group consisting of agar, carrageenan, low methoxyl pectin, xanthan gum, locust bean gum and cellulose derivatives.

In order to make the caseinate replacement composition of the present invention, the components of the caseinate replacement composition are mixed together and then added to the cheese formulation as hereinafter disclosed. Alternatively, each of the components of the caseinate replacement composition of the present invention are added to the imitation cheese formulation as individual components which are then mixed together in the imitation cheese formulation.

In order to make an imitation cheese in accordance with the present invention, it has been found that up to about 70% by weight of the caseinate can be replaced with the caseinate replacement composition of the present invention. Good results have been obtained by replacing up to 50% of caseinate with a caseinate replacement composition made in accordance with the present invention.

The preparation and formulation of imitation cheese is conventional and well-known to those of skill in the art. Imitation cheeses which can be made with the caseinate replacement composition of the present invention include imitation mozzarella, processed american, cheddar, and cream cheese as well as various cheese spreads. There are known variations for the different types and both formulation and process to make differ from manufacturer to manufacturer. Typically, all ingredients are mixed together, then heated for a short period of time, formed into a shape and/or compressed; and finally refrigerated.

These and other aspects of the present invention may be more fully understood by reference to the following examples.

EXAMPLE 1

This example compares a conventional imitation cheese product to four different imitation cheese products made in accordance with the present invention. To make the various cheese products the following formulation was used.

| Component | Percent by Weight Product | |
|---|---|---|
| | Conventional | Invention |
| Water | 41.2 | 41.2 |
| Partially Hydrogenated Soybean Oil | 25.0 | 25.0 |
| Rennet Casein | 19.3 | 9.65 |
| Thin Boiled Starch | 1.0 | 0 |
| Caseinate Replacement of Present Invention | 0 | 9.65 |
| Gelatin Replacement for Thin Boiled Starch | 0 | 1.00 |
| Sweet Whey (dry) | 6.8 | 6.8 |
| Sodium Citrate | 2.0 | 2.0 |
| Sodium Chloride (Salt) | 1.5 | 1.5 |
| Sodium Aluminum Phosphate (Kasal) | 1.0 | 1.0 |
| Adipic Acid | 1.0 | 1.0 |
| Trisodium Phosphate | 0.6 | 0.6 |
| Sorbic Acid | 0.3 | 0.3 |
| Guar Gum | 0.3 | 0.3 |

In each one of the formulations made in accordance with the present invention, all of the thin boiled starch from the conventional formulation was replaced with gelatin. The four formulations of the caseinate replacement composition used in this example were:

| Component | Percent by Weight Composition | | | |
|---|---|---|---|---|
| | A | B | C | D |
| Starch | 70 | 64 | 64 | 70 |
| Gelatin | 20 | 26 | 26 | 30 |
| Carrageenan | 10 | 0 | 4 | 0 |
| Low methoxyl pectin | 0 | 10 | 6 | 0 |

The starch used in the caseinate replacement composition made in accordance with the present invention was a hydroxypropylated, high amylose granular starch having an amylose content of 50% and a degree of substitution of 0.15 to 0.17. Such a product was available from American Maize-Products Company under the name AMALEAN I®. The gelatin was conventional gelatin having a Bloom strength of 250 and sold by Atlantic Gelatin under the name 250 Bloom Type B (Beefhide). The carrageenan was obtained from TIC Gums Inc. under the name TIC Pretested Colloid 775. The low methoxyl pectin was obtained from Hercules under the name SLENDID®.

The imitation cheese product made in this example was an american cheese analog.

In order to prepare these cheeses, the water and oil were preheated (140° F./60° C.) and added to a mixing bowl. With the mixer on low speed, the dry ingredients were slowly added to the oil/water mixture and mixed therein. Next, the steam was turned on to the bowl, the bowl was jacketed, and brought to a pressure of (20–30 psi (1.4–2.1 kg/cm²). The mixture was agitated for 5 minutes while being covered by aluminum foil. Then, the adipic acid was added and mixing continued for 1 more minute. Finally, the steam was turned off and the mixture was placed in a cooler and refrigerated for 16 hours.

At the end of the 16 hours of refrigeration, the imitation cheeses were compared and the results were as follows:

| | Melting | Shredding | Matting | Overall |
|---|---|---|---|---|
| Conventional | Good | Fair | Good | Good |
| A | Fair | Good | Good | Fair–Good |
| B | Good | Good | Good | Good |
| C | Fair | Good | Good | Fair–Good |
| D | Good | Good | Fair–Good | Good |

In order to determine the melting characteristic of the cheeses, a slice of cheese approximately 5.5 mm thick and 46.5 mm in diameter was placed on a tray and melted at 425° F. (220° C.) for 7 minutes. The spread of cheese was then measured.

In order to determine shredability, a hand grater was used and the performance of the cheese during grating was evaluated.

In order to evaluate the matting characteristic of the cheeses, 50 grams of shredded cheese is weighed, placed in a PRINGLES® tube (a cylinder measuring 7.1 cm inside diameter and 23.9 cm height) and a 2 kg. weight is then dropped on it. If the grated cheese product can be separated it is considered to have good matting characteristics.

The appearance of the cheese was also evaluated. Acceptable products should have a matte surface rather than a shiny plastic appearing surface. The cheese made in accordance with the present invention was found to have a matte surface.

The mouth feel of imitation cheese is also an important characteristic of an imitation cheese. The cheese should have a smooth to creamy mouth feel as opposed to mealy or particulate. The cheese made in accordance with the present invention was found to have a smooth mouth feel and be comparable to the conventional imitation cheese.

It will be understood that the claims are intended to cover all changes and modifications of the preferred embodiments of the invention herein chosen for the purpose of illustration which do not constitute a departure from the spirit and scope of the invention.

What is claimed is:

1. An imitation cheese product containing caseinate, wherein the improvement comprises replacing at least a portion of said caseinate with a caseinate replacement composition comprising a hydroxypropylated, high amylose granular starch having a degree of substitution greater than 0.04 and a gel component.

2. The product of claim 1 wherein said caseinate replacement composition comprises:

about 50% to about 80% by weight said granular starch; and about 20% to about 50% by weight said gel component.

3. The product of claim 1 wherein said gel component comprises a gelatin.

4. The product of claim 1 wherein said gel component comprises gelatin and a gum.

5. The product of claim 4 wherein said gum is one or more of the gums selected from the group consisting of agar, carrageenan, low methoxyl pectin, xanthan gum, cellulose derivatives, and locust bean gum.

6. The product of claim 4 wherein said caseinate replacement composition comprises:

about 50% to about 80% by weight of said granular starch; and about 20% to about 50% by weight of said gel component, wherein said gel component is made up of a gum in an amount of about 1% to about 25% by weight of said composition; and a remainder of said gel component being gelatin.

7. The product of claim 4 wherein said gum is low methoxyl pectin or carrageenan.

8. The product of claim 7 wherein said caseinate replacement composition comprises:

about 50% to about 80% by weight of said granular starch;

about 20% to about 50% by weight of said gel component wherein said gel component is made up of pectin in the amount of about 5% to about 15% by weight of said composition;

carrageenan in an amount of about 1% to about 15% by weight of said composition; and a remainder of said gel component being gelatin.

9. A caseinate replacement composition for use in imitation cheese for replacing at least a portion of the caseinate, said composition comprising a hydroxypropylated, high amylose granular starch having a degree of substitution greater than about 0.04 and a gel component.

10. The composition of claim 9 wherein said composition comprises:

about 50% to about 80% by weight of said granular starch; and about 20% to about 50% by weight of said gel component.

11. The composition of claim 9 wherein said gel component comprises gelatin.

12. The composition of claim 9 wherein said gel component comprises gelatin and a gum selected from the group consisting of agar, carrageenan, low methoxyl pectin, xanthan gum, cellulose, and locust bean gum.

13. The composition of claim 12 wherein said composition comprises:

about 50% to about 80% by weight of said granular starch;

about 20% to about 50% by weight of said gel component, said gel component being made up of one or more gums in an amount of about 5% to about 15% by weight of said composition, and a remainder of said gel component being a gelatin.

14. The composition of claim 12 wherein said gum is low methoxyl pectin and carrageenan.

15. In a method for making an imitation cheese from water, vegetable fat/oil, and caseinate, the improvement comprising replacing at least a portion of the caseinate with a caseinate replacement composition comprising a hydroxypropylated, high amylose granular starch having a degree of substitution greater than about 0.04 and a gel component.

16. The method of claim 15 wherein said gel component comprises a gelatin.

17. The method of claim 15 wherein said gel component comprises a gelatin and a gum selected from the group consisting of agar, carrageenan, low methoxyl pectin, cellulose, sodium carboxymethylcellulose, microcrystalline cellulose, methylcellulose, alignates, and gellan gum.

18. In a method for making imitation cheese product containing caseinate and a thin-boiled starch, the improvement comprises replacing at least a portion of said caseinate and all of said thin-boiled starch with a caseinate replacement composition comprising hydroxypropylated, high amylose granular starch having a degree of substitution greater than 0.04 and a gel component.

19. A caseinate replacement composition for use in imitation cheese for replacing at least a portion of the caseinate and any thin-boiled starch present in the imitation cheese, said composition comprising a hydroxypropylated, high amylose granular starch having a degree of substitution greater than about 0.04 and a gel component.

20. In a method for making an imitation cheese from water, vegetable fat/oil, thin-boiled starch, and caseinate, the improvement comprising replacing at least a portion of the caseinate with a caseinate replacement composition comprising a hydroxypropylated, high amylose granular starch having a degree of substitution greater than about 0.04 and a gel component.

\* \* \* \* \*

UNITED STATES PATENT AND TRADEMARK OFFICE
CERTIFICATE OF CORRECTION

PATENT NO. : 5,486,375
DATED : January 23, 1996
INVENTOR(S) : David Yoder et al.

It is certified that error appears in the above-indentified patent and that said Letters Patent is hereby corrected as shown below:

Column 5, line 59, change "(20-30" to --20-30--.

Column 8, line 16 (claim 17), change "gellan" to --gellam--.

Column 18, line 19 (claim 18), change "comprises" to --comprising--; line 21, after "comprising" insert --a--.

Signed and Sealed this

Fourth Day of June, 1996

Attest:

BRUCE LEHMAN

*Attesting Officer*  *Commissioner of Patents and Trademarks*